(12) United States Patent
Hughes

(10) Patent No.: US 7,140,145 B1
(45) Date of Patent: Nov. 28, 2006

(54) WOBBLING FISHING LURE WITH THRASHING LEGS

(76) Inventor: Meredith A. Hughes, 1649 Pele Pl., Indianapolis, IN (US) 46214

( * ) Notice: Subject to any disclaimer, the term of this patent is extended or adjusted under 35 U.S.C. 154(b) by 0 days.

(21) Appl. No.: 11/237,150

(22) Filed: Sep. 29, 2005

(51) Int. Cl.
*A01K 85/00* (2006.01)

(52) U.S. Cl. .................................. 43/42.28

(58) Field of Classification Search ........... 43/42.11, 43/42.21, 42.28, 42.39, 42.18, 42.15, 42.19, 43/42.36, 42.17, 42.16
See application file for complete search history.

(56) References Cited

U.S. PATENT DOCUMENTS

| | | | |
|---|---|---|---|
| 1,309,061 A | 7/1919 | Cassedy, Sr. | |
| 2,876,580 A | 3/1959 | Schwartztrauber | |
| 3,352,052 A | 11/1967 | Woll | |
| 4,257,183 A * | 3/1981 | Arms | 43/42.19 |
| 4,787,167 A | 11/1988 | Wroclawski | |
| 4,887,376 A | 12/1989 | Sibley et al. | |
| 4,891,901 A * | 1/1990 | Baker, Jr. | 43/42.11 |
| 4,953,319 A | 9/1990 | Kasper et al. | |
| 5,511,338 A * | 4/1996 | Costanzo | 43/42.28 |
| 5,899,015 A * | 5/1999 | Link | 43/42.39 |
| 5,956,888 A | 9/1999 | Vreeland et al. | |

\* cited by examiner

*Primary Examiner*—Kurt Rowan
(74) *Attorney, Agent, or Firm*—Donald R. Schoonover

(57) ABSTRACT

A fishing lure having an oval-shaped head portion with a fore-to-aft oriented minor axis and a transversely oriented major axis, a tail portion connected to the head portion wherein the tail portion includes a multitude of strands, a treble hook substantially contained within the multitude of strands, and swivel means connecting the treble hook to the head portion. As the lure is displaced through water by a fishing line, the head portion wobbles causing portions of the treble hook to be intermittently exposed externally of the multitude of strands thereby simulating lifelike thrashing of legs.

5 Claims, 1 Drawing Sheet

WOBBLING FISHING LURE WITH THRASHING LEGS

BACKGROUND OF THE INVENTION

1. Field of the Invention

The present invention relates to sporting goods and, more specifically without limitation, to accessories for fishing.

2. Description of the Related Art

Fishing is a popular activity enjoyed by millions of people worldwide. Although a large segment of the fisherman population participates largely on a recreational level, it should be recognized that fishing is also one of the largest food-acquiring and -producing industries in the world. Millions of tons of fish of all types are caught and processed annually to feed a large portion of the world's population. Regardless of the reason for fishing, people of all ages enjoy doing so in streams, rivers, lakes, bays, and oceans as the climate and seasons of the year permit.

A fisherman is perhaps one of the most diversely equipped of all outdoor sportsmen. The basic items needed to catch a fish are the proverbial hook, line, and sinker. Bait, of course, is a given in that proverbial combination. So, one might find a fisherman with a bamboo pole, a length of line, and a baited hook. But, for many fishermen, their equipment goes far beyond that simple array. Skilled, experienced anglers generally have a variety of fishing rods, reels, line types, hooks, floats, and artificial lures.

For those who enjoy artificial bait casting, a large variety of such lures are readily available on the market. The purpose of these lures is to simulate live bait. For this reason, they are provided is a wide range of styles. Regardless, they is always room for further improvement of an artificial lure that is more lifelike, such as one that operatively simulates a lifelike bait having kicking and thrashing legs.

What is needed is an artificial lure operatively simulates a lifelike bait having kicking and thrashing legs.

SUMMARY OF THE INVENTION

The improvements of the fishing lure of the present invention include an oval-shaped head portion having a surface, a major axis, and a minor axis that intersects the surface at a front juncture and a rear juncture; swivel means having a first swivel device with a first swivel front end and a first swivel rear end wherein the first swivel front end is structured and configured to be operatively connected to a fishing line and the first swivel rear end is pivotally connected to the head portion at the front juncture, a central element having a central element front end and a central element rear end wherein the central element front end is pivotally connected to the head portion at the rear juncture, and a second swivel device having a second swivel front end and a second swivel rear end wherein the second swivel front end is pivotally connected to the central element rear end; a treble hook having a shank, barbs, and arcuate leg portions separately connecting the barbs to the shank, the shank being pivotally connected to the second swivel rear end; a tail portion having an annular portion connected to the head portion whereat the annular portion encircles the rear juncture, and a multitude of strands connected to, and operatively pluming rearwardly from, the annular portion wherein the multitude of strands operatively fill the space between the outermost strands of the multitude of strands and the treble hook with only portions of the arcuate leg portions being operatively and intermittently visible from the rear as the lure is being displaced through water by a fishing line connected to the first swivel front end.

PRINCIPAL OBJECTS AND ADVANTAGES OF THE INVENTION

The principal objects and advantages of the present invention include: providing an artificial lure that operatively simulates a lifelike bait having kicking and thrashing legs; and generally providing such an artificial lure that is reliable in performance, capable of long lasting life, and particularly well adapted for the proposed usages thereof.

Other objects and advantages of this invention will become apparent from the following description taken in conjunction with the accompanying drawings wherein are set forth, by way of illustration and example, certain embodiments of this invention.

DETAILED DESCRIPTION OF THE INVENTION

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

Figure 3:
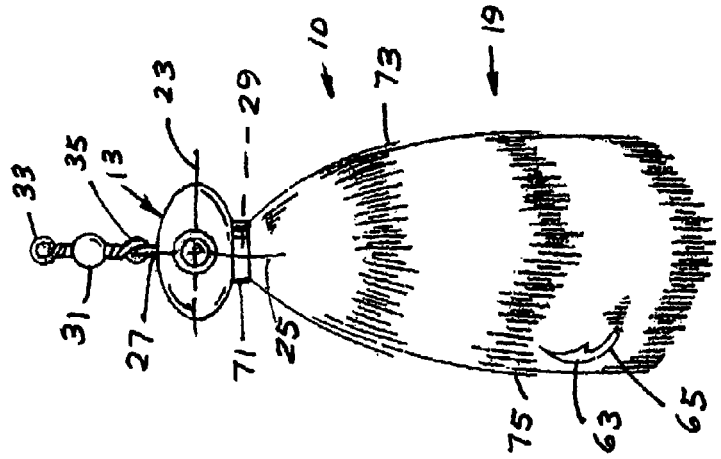
FIG. 3 is a top plan view of the wobbling fishing lure with thrashing legs in accordance with the present invention.
Figure 1:
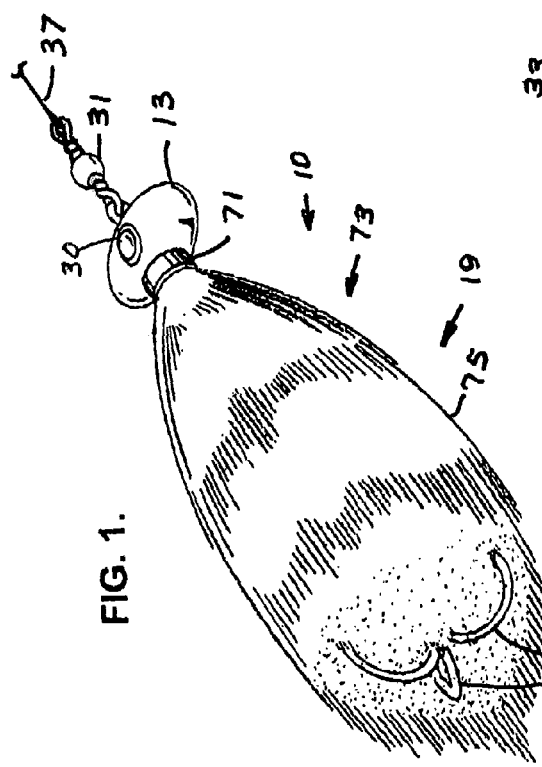
FIG. 1 is a perspective view of a wobbling fishing lure with thrashing legs in accordance with the present invention.
Figure 2:
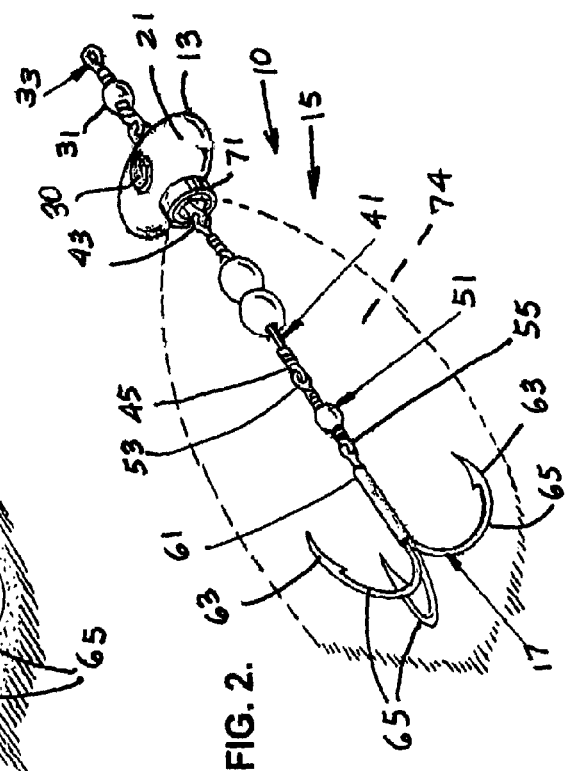
FIG. 2 is a perspective and fragmentary view of the wobbling fishing lure with thrashing legs, showing swivel means and a treble hook thereof.

The reference numeral 10 generally refers to a fishing lure in accordance with the present invention, as shown in FIGS. 1 through 3. The fishing lure 10 includes a head portion 13, swivel means 15, a treble hook 17, and a tail portion 19.

The head portion 13 is oval-shaped and has a surface 21, a major axis 23, and a minor axis 25 that intersects the surface 21 at a front juncture 27 and a rear juncture 29. If desired, the head portion 13 may include an eye 30 or a pair of eyes 30 on opposing sides thereof, as shown in the Figures.

The swivel means 15 includes a first swivel device 31 having a first swivel front end 33 and a first swivel rear end 35 wherein the first swivel front end 33 is structured and configured to be operatively connected to a fishing line 37 and the first swivel rear end 35 is pivotally connected to the head portion 13 at the front juncture 27. The swivel means 15 also includes a central element 41 having a central element front end 43 and a central element rear end 45. The central element front end 43 is pivotally connected to the head portion 13 at the rear juncture 29. The swivel means 15 further includes a second swivel device 51 having a second swivel front end 53 and a second swivel rear end 55. The second swivel front end 53 is pivotally connected to the central element rear end 45.

The treble hook 17 has a shank 61, barbs 63, and arcuate leg portions 65 separately connecting the barbs 63 to the shank 61. The shank 61 is pivotally connected to the second swivel rear end 55.

The tail portion 19 includes an annular portion 71 connected to the head portion 13 whereat the annular portion 71 encircles the rear juncture 29. The tail portion 19 also includes a multitude of strands 73, such as feathers or short pieces of acrylic string for example, connected to, and operatively pluming rearwardly from, the annular portion 71 wherein the multitude of strands 73 operatively fill the space 74 between the outermost strands 75 of the multitude of strands 73 and the treble hook 17 with only portions of the arcuate leg portions 65 being operatively and intermittently visible from and near the rear, as shown in FIGS. 1 and 3 and as described herein, as the lure 10 is being displaced through water by the fishing line 37 connected to the first swivel front end 33. If desired, the multitude of strands 73 may be constructed of iridescent material. The multitude of strands 73 may also be coated or saturated with a fish scent.

The magnitude of the transversely oriented major axis 23 is substantially greater than the fore-to-aft oriented minor axis 25 causing the head portion 13 to wobble back and forth as the lure 10 is displaced through water by the first swivel device 31 at the front juncture 27 and the drag created by water resistance to operative displacement of the tail portion 19. The wobble causes the multitude of strands 73 to meander back and forth to intermittently expose different portions of the leg portions 65 of the treble hook 17, externally of the multitude of strands 73, to thereby simulate kicking and thrashing of the legs 65 by the lure 10. Preferably, the color of the leg portions 65 contrasts with the color of the multitude of strands 73 so the simulated kicking and thrashing motion is more conspicuous.

In an application of the fishing lure 10 of the present invention, a fishing line 37 is connected to the first swivel front end 33 as commonly known in the art. The lure 10 is then operatively displaced through a fish-containing body of water, such as by trolling, reeling, or other appropriate method. As the lure is displaced through the water, the lure wobbles back and forth causing the legs of the treble hook to move from side to side to be intermittently exposed rearwardly and sidewise from the multitude of strands to therey simulate lifelike thrashing of the legs thereof.

It is to be understood that while certain forms of the present invention have been illustrated and described herein, it is not to be limited to the specific forms or arrangement of parts as described and shown.

What is claimed and desired to be covered by Letters Patent is:

1. A fishing lure, comprising:
   (a) an oval-shaped head portion having a surface, a transversely oriented major axis, and a fore-to-aft oriented minor axis that intersects the surface at a front juncture and a rear juncture;
   (b) swivel means having
      (1) a first swivel front end and a first swivel rear end wherein the first swivel front end is structured and configured to be operatively connected to a fishing line and the first swivel rear end is pivotally connected to the head portion at the front juncture,
      (2) a central element having a central element front end and a central element rear end, the central element front end being pivotally connected to the head portion at the rear juncture, and
      (3) a second swivel device having a second swivel rear end and a second swivel front end, the second swivel front end being pivotally connected to the central element rear end;
   (c) a treble hook having a shank, barbs, and arcuate leg portions separately connecting the barbs to the shank, the shank being pivotally connected to the second swivel rear end;
   (d) a tail portion including:
      (1) an annular portion connected to the head portion whereat the annular portion encircles the rear juncture, and
      (2) a multitude of strands connected to, and operatively pluming rearwardly from, the annular portion wherein the multitude of strands operatively fill the space between outermost strands of the multitude of strands and the treble hook with only portions of the arcuate leg portions being operatively and intermittently visible from and near the rear of the lure as the lure is being displaced through water by a fishing line connected to the first swivel front end.

2. The fishing lure as described in claim 1, wherein the magnitude of the major axis of the head portion is substantially greater than the minor axis of the head portion thereby causing the head portion to wobble as the lure is displaced through water by the swivel connection at the front juncture and the drag created by water resistance to operative displacement of the tail portion.

3. The fishing lure as described in claim 1, wherein the magnitude of the major axis of the head portion is substantially greater than the minor axis of the head portion thereby causing the multitude of strands to meander back and forth to intermittently expose different portions of the leg portions of the treble hook externally of the multitude of strands to thereby simulate kicking of legs by the lure.

4. The fishing lure as described in claim 1, wherein a color of the leg portions contrasts with a color of the multitude of strands.

5. A fishing lure, comprising:
   (a) an oval-shaped head portion having a surface, a major axis, and a minor axis that intersects the surface at a front juncture and a rear juncture;
   (b) swivel means including:
      (1) a first swivel device having a first swivel front end and a first swivel rear end wherein the first swivel front end is structured and configured to be operatively connected to a fishing line and the first swivel rear end is pivotally connected to the head portion at the front juncture,
      (2) a central element having a central element front end and a central element rear end, the central element front end being pivotally connected to the head portion at the rear juncture, and
      (3) a second swivel device having a second swivel front end and a second swivel rear end, the second swivel front end being pivotally connected to the central element rear end;
   (c) a treble hook having a shank, barbs, and arcuate leg portions separately connecting the barbs to the shank, the shank being pivotally connected to the second swivel rear end;
   (d) a tail portion including:
      (1) an annular portion connected to the head portion whereat the annular portion encircles the rear juncture, and
      (2) a multitude of strands connected to, and operatively pluming rearwardly from, the annular portion wherein the multitude of strands operatively fill the space between the outermost strands of the multitude of strands and the treble hook with only portions of the arcuate leg portions being operatively and intermittently visible from the rear as the lure is being displaced through water by a fishing line connected to the first swivel front end.

* * * * *